(12) United States Patent
Raksha et al.

(10) Patent No.: US 9,662,925 B2
(45) Date of Patent: May 30, 2017

(54) ANISOTROPIC MAGNETIC FLAKES

(75) Inventors: Vladimir P. Raksha, Santa Rosa, CA (US); Charles T. Markantes, Santa Rosa, CA (US); Paul G. Coombs, Santa Rosa, CA (US); Roger W. Phillips, Santa Rosa, CA (US); Paul T. Kohlmann, Windsor, CA (US); Alberto Argoitia, Santa Rosa, CA (US); Neil Teitelbaum, Ottawa (CA)

(73) Assignee: Viavi Solutions Inc., Milpitas, CA (US)

( * ) Notice: Subject to any disclaimer, the term of this patent is extended or adjusted under 35 U.S.C. 154(b) by 1066 days.

(21) Appl. No.: 12/233,667

(22) Filed: Sep. 19, 2008

(65) Prior Publication Data

US 2009/0072185 A1    Mar. 19, 2009

Related U.S. Application Data

(60) Continuation-in-part of application No. 12/051,164, filed on Mar. 19, 2008, and a continuation-in-part of
(Continued)

(51) Int. Cl.
*C09D 5/23* (2006.01)
*B32B 5/00* (2006.01)
(Continued)

(52) U.S. Cl.
CPC ............ *B42D 25/369* (2014.10); *B82Y 30/00* (2013.01); *C09C 1/0015* (2013.01); *C09C 1/0021* (2013.01); *H01F 1/0027* (2013.01); *B42D 25/29* (2014.10); *B42D 2033/16* (2013.01); *B42D 2033/18* (2013.01); *B42D 2035/14* (2013.01); *C01P 2004/02* (2013.01); *C01P 2004/03* (2013.01); *C01P 2004/61* (2013.01); *C01P 2004/62* (2013.01); *C01P 2004/64* (2013.01);
(Continued)

(58) Field of Classification Search
None
See application file for complete search history.

(56) References Cited

U.S. PATENT DOCUMENTS 2,418,479 A    4/1947  Pratt et al. .................. 427/550
3,293,331 A   12/1966  Doherty ....................... 264/1.31
(Continued)

FOREIGN PATENT DOCUMENTS

WO          02/073250      9/2002 ............ C09C 1/100
WO     WO 2004024836 A2 *  3/2004
(Continued)

OTHER PUBLICATIONS

Colarieti et al., Origin of Magnetic Anisotropy of Gd Metal., Phys. Rev. Lett., vol. 91, 15, 157201-1, (Oct. 2003).*
(Continued)

*Primary Examiner* — Alexandre Ferre
(74) *Attorney, Agent, or Firm* — Harrity & Harrity, LLP

(57) ABSTRACT

The invention relates to anisotropic, reflective, magnetic flakes. In a liquid carrier and under influence of an external magnetic field, the flakes attract to one another side-by-side and form ribbons which provide higher reflectivity to a coating and may be used as a security feature for authentication of an object.

24 Claims, 12 Drawing Sheets

Related U.S. Application Data application No. 12/107,152, filed on Apr. 22, 2008, now abandoned, and a continuation-in-part of application No. 11/461,870, filed on Aug. 2, 2006, now Pat. No. 7,625,632, which is a continuation-in-part of application No. 11/028,819, filed on Jan. 4, 2005, now Pat. No. 7,300,695, which is a division of application No. 10/243,111, filed on Sep. 13, 2002, now Pat. No. 6,902,807, said application No. 11/461,870 is a continuation-in-part of application No. 11/313,165, filed on Dec. 20, 2005, now Pat. No. 7,604,855, which is a continuation-in-part of application No. 11/022,106, filed on Dec. 22, 2004, now Pat. No. 7,517,578, which is a continuation-in-part of application No. 10/386,894, filed on Mar. 11, 2003, now Pat. No. 7,047,883.

(60) Provisional application No. 60/973,546, filed on Sep. 19, 2007, provisional application No. 60/919,204, filed on Mar. 21, 2007, provisional application No. 60/913,423, filed on Apr. 23, 2007, provisional application No. 60/410,546, filed on Sep. 13, 2002, provisional application No. 60/410,547, filed on Sep. 13, 2002, provisional application No. 60/396,210, filed on Jul. 15, 2002, provisional application No. 60/713,127, filed on Aug. 31, 2005.

(51) Int. Cl.
| | | |
|---|---|---|
| B44C 1/22 | (2006.01) | |
| B42D 25/369 | (2014.01) | |
| B82Y 30/00 | (2011.01) | |
| C09C 1/00 | (2006.01) | |
| H01F 1/00 | (2006.01) | |
| H01F 41/16 | (2006.01) | |
| B42D 25/29 | (2014.01) | |

(52) U.S. Cl.
CPC ...... *C01P 2006/42* (2013.01); *C01P 2006/60* (2013.01); *C09C 2200/1054* (2013.01); *C09C 2200/304* (2013.01); *C09C 2200/306* (2013.01); *C09C 2200/308* (2013.01); *C09C 2200/401* (2013.01); *C09C 2210/40* (2013.01); *C09C 2220/20* (2013.01); *H01F 41/16* (2013.01); *Y10T 428/24372* (2015.01); *Y10T 428/2982* (2015.01)

(56) References Cited

U.S. PATENT DOCUMENTS

| | | | | |
|---|---|---|---|---|
| 3,633,720 | A | 1/1972 | Tyler | 400/105 |
| 3,791,864 | A | 2/1974 | Steingroever | 427/550 |
| 3,853,676 | A | 12/1974 | Graves | 428/207 |
| 4,619,777 | A | 10/1986 | Melzer et al. | 252/62.54 |
| 4,657,349 | A | 4/1987 | Labes et al. | 359/296 |
| 4,859,495 | A | 8/1989 | Peng | 427/548 |
| 5,223,360 | A | 6/1993 | Prengel et al. | 430/39 |
| 5,311,386 | A * | 5/1994 | Mallary | 360/125.33 |
| 5,354,374 | A | 10/1994 | Prengel | 106/459 |
| 5,364,689 | A | 11/1994 | Kashiwagi et al. | 428/195.1 |
| 5,630,877 | A | 5/1997 | Kashiwagi et al. | 118/623 |
| 5,858,078 | A | 1/1999 | Andes et al. | 106/347 |
| 6,082,778 | A * | 7/2000 | Solmsdorf | 283/82 |
| 6,103,361 | A | 8/2000 | Batzar et al. | 428/323 |
| 6,527,972 | B1 | 3/2003 | Fuchs et al. | 252/62.54 |
| 6,620,480 | B1 | 9/2003 | Ledieu | 428/64.4 |
| 6,630,018 | B2 | 10/2003 | Bauer et al. | 106/415 |
| 6,643,001 | B1 | 11/2003 | Faris | 356/37 |
| 6,667,118 | B1 | 12/2003 | Chang et al. | 428/829 |
| 6,670,032 | B2 | 12/2003 | Margulies et al. | 428/332 |
| 6,692,830 | B2 | 2/2004 | Argoitia et al. | |
| 6,749,936 | B2 | 6/2004 | Argoitia et al. | |
| 6,759,097 | B2 | 7/2004 | Phillips et al. | 427/510 |
| 6,808,806 | B2 | 10/2004 | Phillips et al. | 428/403 |
| 6,838,166 | B2 | 1/2005 | Phillips et al. | 428/323 |
| 6,841,238 | B2 | 1/2005 | Argoitia et al. | |
| 6,902,807 | B1 | 6/2005 | Argoitia et al. | 428/403 |
| 7,047,883 | B2 | 5/2006 | Raksha et al. | 101/489 |
| 7,189,583 | B2 | 3/2007 | Drewes | 438/3 |
| 7,241,489 | B2 | 7/2007 | Argoitia et al. | 428/323 |
| 7,262,016 | B2 * | 8/2007 | Huang et al. | 435/6.19 |
| 7,300,695 | B2 | 11/2007 | Argoitia et al. | 428/206 |
| 7,332,101 | B2 | 2/2008 | Singh et al. | 252/62.51 R |
| 7,396,401 | B2 | 7/2008 | Jungnitz et al. | 106/415 |
| 2002/0160194 | A1 * | 10/2002 | Phillips et al. | 428/403 |
| 2003/0026949 | A1 | 2/2003 | Overholt et al. | 428/143 |
| 2003/0185972 | A1 | 10/2003 | Rieck et al. | 427/140 |
| 2004/0052976 | A1 | 3/2004 | Buczek et al. | 427/598 |
| 2004/0166308 | A1 * | 8/2004 | Raksha et al. | 428/329 |
| 2005/0024626 | A1 | 2/2005 | Faris et al. | 356/71 |
| 2005/0031835 | A1 | 2/2005 | Overholt et al. | 428/207 |
| 2005/0106367 | A1 | 5/2005 | Raksha et al. | |
| 2006/0029793 | A1 | 2/2006 | Overholt et al. | 428/325 |
| 2006/0035080 | A1 * | 2/2006 | Argoitia | 428/402 |
| 2006/0097515 | A1 | 5/2006 | Raksha et al. | |
| 2006/0150854 | A1 | 7/2006 | Benninger et al. | 101/489 |
| 2006/0198998 | A1 | 9/2006 | Raksha et al. | 428/323 |
| 2006/0263539 | A1 | 11/2006 | Argoitia et al. | 427/547 |
| 2007/0251603 | A1 | 11/2007 | Olsen | 148/104 |
| 2007/0252300 | A1 | 11/2007 | Papham | 264/108 |
| 2007/0254106 | A1 | 11/2007 | Olsen et al. | 427/355 |
| 2008/0003413 | A1 | 1/2008 | Argoitia | 428/201 |
| 2008/0107856 | A1 | 5/2008 | Argoitia | 428/201 |
| 2008/0233401 | A1 | 9/2008 | Raksha et al. | 428/404 |
| 2008/0290179 | A1 | 11/2008 | Raksha et al. | 235/494 |

FOREIGN PATENT DOCUMENTS

| | | | | |
|---|---|---|---|---|
| WO | 2005/002866 | | 1/2005 | B05D 3/14 |
| WO | 2006/114289 | | 11/2006 | B05D 5/06 |

OTHER PUBLICATIONS

Bruce M. Moskowitz, "Hitchhiker's Guide to Magnetism," Environmental Magnetism Workshop, Jun. 5-8, 1991, (http://www.irm.umn.edu/hg2m/hg2m_index.html).

Kun Zhang, "Stress induced magnetic anisotropy of Xe-ion-irradiated Ni thin films", Nucl. Instr. and Meth. In Phys. Res., B 243 (2006), 51-57.

Birol, "Magnetic domain structures in as-quenched and annealed $Fe_{78}B_{13}Si_9$ metallic glass ribbons", Mat. and Chem. Tech. Research Institute, Marmara Research Center, Tr. J. of physics, vol. 22, 481-488, 1998.

Myong R. Kim et al., "Microstructural origin of in-plane magnetic anisotropy in magnetron in-line sputtered CoPtCr thin-film disks", J. Appl. Phys. 74 (7), 4643-4650, Oct. 1993.

D.J. Twisselmann et al., "Origins of substrate-topography-induced magnetic anisotropy in sputtered cobalt-alloy films", Journal of Applied Physics, vol. 92, No. 6, 3223-3230, Sep. 2002.

H-R Wenk et al., "Texture and anisotropy", Rep. Prog. Phys 67, 1367-1428, Institute of Physics Publishing, 2004.

Q. Zeng et al., "Thickness dependence of the microstructure and magnetic anisotropy of sputtered $Fe_{50}Ni_{50}$ films", Journal of Applied Physics 99, 08M302, 2006.

Y. Suzuki et al., "The role of strain in magnetic anisotropy of manganite thin films", Appl. Phys. Lett 71(1), Jul. 7, 1997.

C. Denis Mee, "Magnetic Recording", McGraw-Hill Book Company, 1987, ISBN 0-07-041271-5, vol. 1, p. 164.

Finn Jorgensen, "The Complete Handbook of Magnetic Recording", TAB Professional and Reference Books, ISBN 0-8306-1979-8, p. 382-383, 1988.

E. Climent et al., "Dynamics of self-assembled chaining in magnetorheological fluids", Langmuir, 2004, 20, 507-513.

J.H.E Promislow et al., "Aggregation kinetics of paramagnetic colloidal particles", J.Chem.Phys.,1995, 102, 5492-5498.

(56) References Cited

OTHER PUBLICATIONS

J. H. Tan, et al., "Effect of stress-induced magnetic anisotropy on the properties of giant magnetostrictive single layer and multilayer thin films", MRS 2004 Fall Meeting, paper #W2.7.

C. Miguel et al., "Stress and/or Field Induced Magnetic Anisotropy in the Amorphous $Fe_{73.5}Cu_1Nb_3Si_{15.5}B_7$ Alloy: Influence on the Coercivity, Saturation Magnetostriction and Magneto-Impedance Response". Physica status solidi (a), vol. 194, Issue 1, 2002, p. 291-303.

P. Bruno et al., "Theoretical investigation of magnetic surface anisotropy", Journal de physique, Colloque C8, Supplement au No. 12, Tome 49, Dec. 1988.

S. Sugano et al., "Magneto-Optics", Springer, 2000, ISBN 3-540-65961-7.

R. J. Gambino et al. "Magneto-optical recording materials", IEEE Press, 2000, ISBN 0-7803-1009-8, p. 48-53.

McDaniel et al. Handbook of the magneto-optical recording, Noyes Publications, 1997, ISBN-0-8155-1391-7.

E. du Tremolet de La Cheisserie et al., "Magnetism. Materials and applications." Springer 2005, ISBN-0-387-23000-9.

S. Khizroev, et al., "Perpendicular magnetic recording", Kluwer Academic Publishers, 2004, ISBN 1-4020-2662-5, p. 127-131.

\* cited by examiner

ANISOTROPIC MAGNETIC FLAKES

CROSS-REFERENCE TO RELATED APPLICATIONS

The present invention claims priority from U.S. Provisional Application Ser. No. 60/973,546 filed Sep. 19, 2007, which is incorporated herein by reference.

This application is a continuation-in-part of U.S. patent application Ser. No. 12/051,164, filed Mar. 19, 2008, which claims priority from U.S. Provisional Application Ser. No. 60/919,204, filed on Mar. 21, 2007, which is incorporated herein by reference.

This application is a continuation-in-part of U.S. patent application Ser. No. 12/107,152, filed Apr. 22, 2008, now abandoned which claims priority from U.S. Provisional Application Ser. No. 60/913,423, filed Apr. 23, 2007, which is incorporated herein by reference.

This application is a continuation-in-part of U.S. patent application Ser. No. 11/461,870, filed Aug. 2, 2006, now U.S. Pat. No. 7,625,632 which is incorporated herein by reference for all purposes. The Ser. No. 11/461,870 is a continuation-in-part of U.S. patent application Ser. No. 11/028,819, filed on Jan. 4, 2005, now U.S. Pat. No. 7,300,695, which is a divisional application of U.S. patent application Ser. No. 10/243,111, filed on Sep. 13, 2002, now U.S. Pat. No. 6,902,807, which are incorporated herein by reference for all purposes. The Ser. No. 11/461,870 application is also a continuation-in-part of U.S. patent application Ser. No. 11/313,165, filed Dec. 20, 2005, now U.S. Pat. No. 7,604,855 which is a continuation-in-part of U.S. patent application Ser. No. 11/022,106, now U.S. Pat. No. 7,517,578 filed on Dec. 22, 2004, which is a continuation-in-part of U.S. patent application Ser. No. 10/386,894, filed Mar. 11, 2003, now U.S. Pat. No. 7,047,883 which claims priority from U.S. Provisional Patent Application Ser. No. 60/410,546 filed Sep. 13, 2002, from U.S. Provisional Patent Application Ser. No. 60/410,547 filed Sep. 13, 2002, and from U.S. Provisional Patent Application Ser. No. 60/396,210 filed Jul. 15, 2002, which are all incorporated herein by reference for all purposes. The Ser. No. 11/461,870 application also claims priority from U.S. patent application Ser. No. 60/713,127 filed Aug. 31, 2005, incorporated herein by reference for all purposes.

The Ser. No. 11/461,870 patent application is related to commonly owned U.S. patent application Ser. No. 10/029,405, filed Dec. 20, 2001, now U.S. Pat. No. 6,749,936; is related to commonly owned U.S. patent application Ser. No. 09/919,346, filed Jul. 31, 2001, now U.S. Pat. No. 6,692,830; and is related to commonly owned U.S. patent application Ser. No. 10/117,307, filed Apr. 5, 2002, now U.S. Pat. No. 6,841,238, the disclosures of which are hereby incorporated in their entirety for all purposes.

TECHNICAL FIELD

The present invention relates generally to thin pigment flakes, and more particularly to providing alignment of thin magnetic flakes in an external magnetic field.

BACKGROUND OF THE INVENTION

Reflective metallic and color-shifting flakes are used in reflective and color-shifting inks or paints. Images printed with the inks or coatings made using the paints have their reflective or color parameters worse than those of a solitary flake due to the gaps between adjacent flakes filled with a less reflective carrier. An increase of pigment concentration can improve the reflectivity of the printed images and paint coatings, but is associated with additional cost, with thicker coatings, and with flakes overlapping one another preventing them from lying flat against the substrate.

Accordingly, it is an object of the instant invention to provide a cost effective highly reflective coating containing reflective or color-shifting flakes. It is another object of the invention to provide flakes for such coatings or inks, as well as a method of manufacturing the flakes enabling said coatings. It is yet another object of the invention to provide a method of authentication of an object having the reflective coating thereon.

SUMMARY OF THE INVENTION

The present invention relates to an anisotropic magnetic flake for forming a reflective coating. The flake has a layered structure having a thickness in the range of 50 nm-10 microns and a two-dimensional shape with a longest planar dimension in the range of 1-500 microns. The layered structure includes a magnetic layer for aligning the flake substantially parallel to the surface of the reflective coating, when said flake is disposed in a liquid carrier under influence of an external magnetic field. The magnetic layer has a structure which provides in-plane magnetic anisotropy forming an angle of at least 20 degrees with the longest planar dimension. Optionally, the layered structure first and second reflector layers having reflectivity of greater than 50%, for providing reflectivity to the reflective coating; wherein the magnetic layer is hidden between the reflector layers.

One aspect of the invention relates to the described above flakes having a specific two-dimensional shape particularly well suited for making ribbons. The shape of the flakes has two sides substantially parallel to each other. The magnetic layer is formed so as to have an in-plane magnetic anisotropy substantially orthogonal to the two sides for alignment of the flake side-by-side with one or more flakes of a same structure when said flakes are disposed in a liquid carrier under influence of an external magnetic field while forming the reflective coating. The flakes have no grating thereon for providing high specular reflectivity. Preferably, the flakes have a square shape.

Another aspect of the present invention relates to a method of manufacturing the flakes wherein the anisotropy of the magnetic layer is substantially orthogonal to two sides of the two-dimensional shape of the flake. The method includes the steps of: (a) providing a substrate for supporting a releasable coating including the first and second reflector layers and the magnetic layer formed of a magnetic material; (b) embossing or etching the substrate with a plurality of frames having the two-dimensional shape with the two sides substantially orthogonal to a first direction, before or after the releasable coating is applied to the substrate; (c) coating the substrate with the releasable coating so as to provide the magnetic layer having a magnetic anisotropy in the first direction, wherein the releasable coating upon removal from the substrate breaks apart into the flakes; and, (d) removing the releasable coating from the substrate and breaking it into the flakes. In one embodiment of the method, the magnetic layer is deposited using two sources which provide the magnetic material to a same portion of the substrate from different angles.

Yet another aspect of the present invention relates to a coating including a solidified carrier and a plurality of flakes dispersed therein. All the flakes have a same two-dimensional shape, such that two sides thereof are substantially parallel to each other, and have the magnetic layer such that the in-plane magnetic anisotropy is substantially orthogonal to said two sides. A portion of the flakes forms a ribbon of at least three flakes adjacent to one another so as to be side-by-side with gaps between the flakes of no greater than 500 nm, when said flakes are disposed in a liquid carrier under influence of an external magnetic field while forming the coating.

The ribbons of three or more flakes may be used as a security feature on documents, banknotes, etc. The instant invention provides a method of authentication of an object including the step of identifying a ribbon in a flake-containing coating. In one embodiment, the flakes forming the ribbon have a binary grating thereon, which provides a pattern of reflected light beams used for authentication of the object.

BRIEF DESCRIPTION OF THE DRAWINGS

The invention will be described in greater detail with reference to the accompanying drawings which represent preferred embodiments thereof, wherein.

DETAILED DESCRIPTION

Figure 1A:
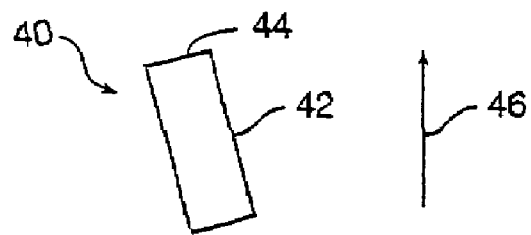
FIG. 1A is a simplified plan view of a conventional magnetic flake in an external magnetic field, according to prior art.
Figure 1B:
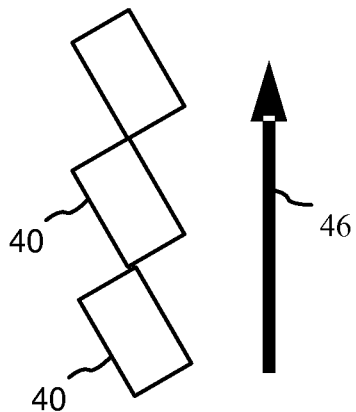
FIG. 1B is a simplified plan view of a chain formed of magnetic flakes shown in FIG. 1A, in an external magnetic field.

A magnetic flake is a pigment flake that includes a magnetic material. It is known that a square-shaped magnetic flake without a grating has its easy magnetic axis, i.e. a direction of its magnetic moment, along a diagonal of the square, and North and South magnetic poles—at opposite corners of the square. FIG. 1A, which is a copy of FIG. 2a from U.S. Pat. No. 7,300,695 issued Nov. 27, 2007, to Argoitia et al., illustrates a rectangular magnetic flake 40 with sides 42 and 44 in a liquid medium and under influence of a magnetic field. The flake 40 orients so as to have a diagonal along the direction of the applied magnetic field 46. North and South magnetic poles of different flakes attract and flakes may form corner-to-corner chains such as shown in FIG. 1B.

Figure 2:
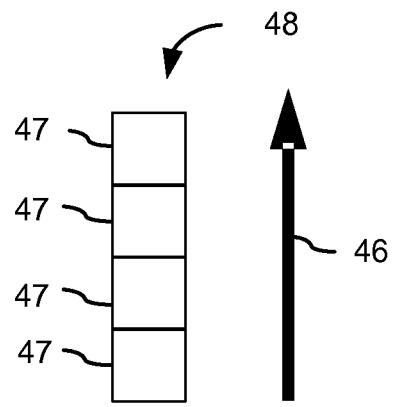
FIG. 2 is a simplified plan view of a ribbon formed by anisotropic magnetic flakes of the instant invention in an external magnetic field.

It has been unexpectedly discovered that, when dispersed in a liquid carrier and impacted by a magnetic field, square-shaped, non-grated magnetic flakes of a particular kind form different structures, namely ribbons. With reference to FIG. 2 flakes 47 within the ribbons 48 are adjacent to each other side-by-side as opposite to the corner-to-corner adjacency shown in FIG. 1B. The side-by-side attraction of two flakes 47 manifests the location of magnetic poles at two opposite sides of the square flake 47 and the direction of a magnetic moment parallel to two other sides of the square 47. The square flakes 47 orient in a magnetic field 46 so as to align a side of a flake 47 along the lines of the magnetic field 46.

In general terms, conventional non-diffractive flakes have easy axes along their longest planar dimensions, whereas the flake of the instant invention has an easy axis, or magnetic anisotropy, at an angle with the longest planar dimension.

The unexpected effect may be attributed to magnetic anisotropy caused by a method of flake manufacturing. Possible types of magnetic anisotropy, such as magnetocrystalline anisotropy, stress-induced magnetic anisotropy, and magnetic anisotropy induced by the substrate topography, are described in "Hitchhiker's Guide to Magnetism," Bruce M. Moskowitz, Environmental Magnetism Workshop, 5-8 Jun. 1991.

Figure 3A:
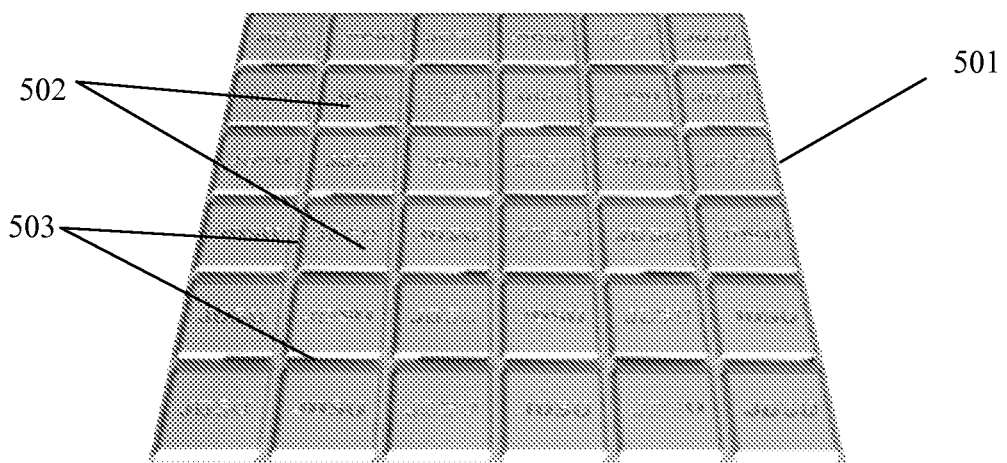
FIG. 3A is a perspective view of a substrate used for manufacturing anisotropic magnetic flakes of the instant invention.
Figure 3B:
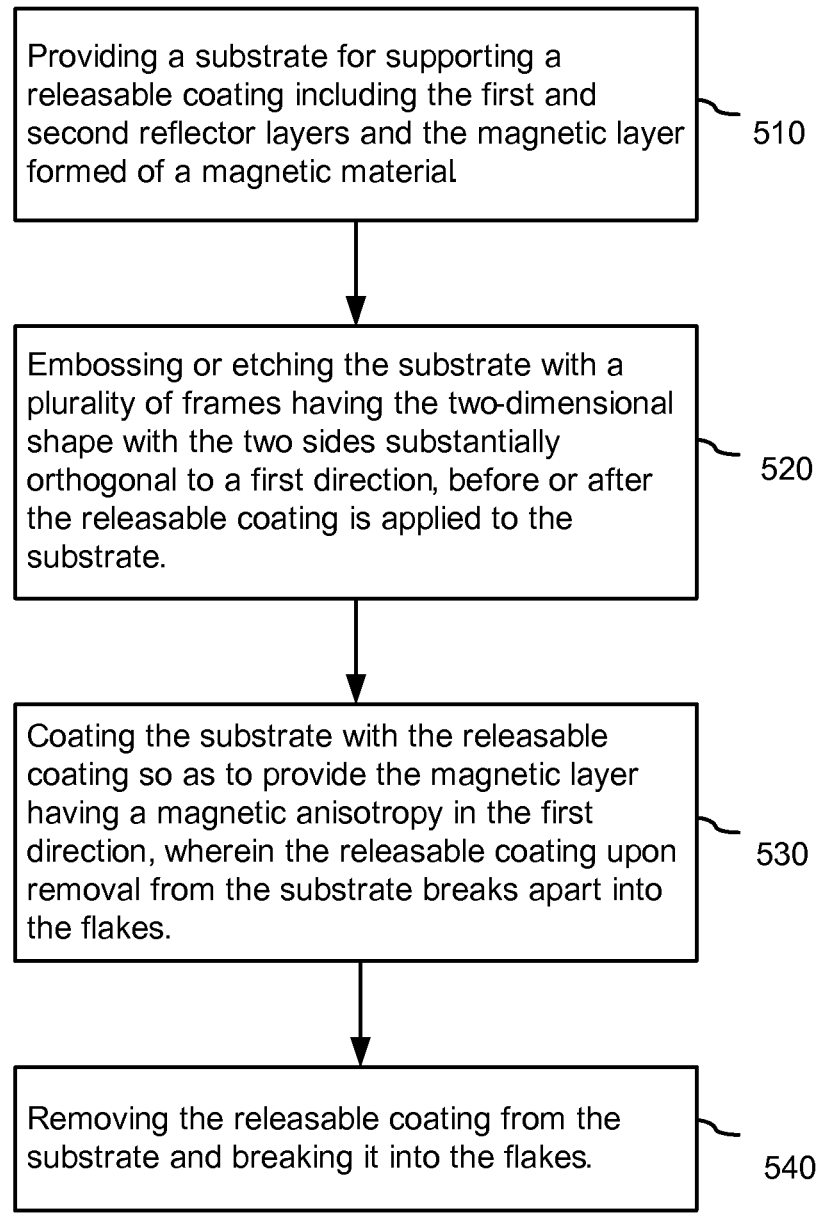
FIG. 3B is a flow chart of a method of flake manufacturing in accordance with the instant invention.

With reference to FIG. 3B, the method of flake manufacturing includes a substrate-providing step 510 wherein a substrate is provided for supporting a releasable coating. In a substrate embossing/etching step 520, the substrate, optionally with a coating thereon, is provided with a plurality of frames embossed or etched onto the substrate, for example as taught in U.S. Pat. No. 6,902,807 issued Jun. 7, 2005, and US Patent Application No. 20080107856 published May 8, 2008, both to Argoitia et al. and incorporated herein by reference. The shape and orientation of the frames is related to the direction of the anisotropy so that the two-dimensional shape of a frame has two sides substantially parallel to each other and substantially orthogonal to the desired anisotropy direction.

Then, in a coating step 530, the substrate is coated with the releasable coating as disclosed in U.S. Pat. No. 6,838, 166 issued Jan. 4, 2005, and U.S. Pat. No. 6,808,806 issued Oct. 26, 2004, both to Phillips et al. and incorporated herein by reference. The releasable coating includes the first and second reflector layers and a magnetic layer formed of a magnetic material. The magnetic layer is deposited so as to have a magnetic anisotropy in a desired direction. Then, in a coating removing step 540, the releasable coating is removed from the substrate and broken apart providing anisotropic magnetic flakes of the instant invention.

In one embodiment of the method, a substrate provided in the substrate-providing step 510 is patterned in the substrate embossing/etching step 520 following the step 510. With reference to in FIG. 3A, a substrate 501 has a pattern of squares 502 separated by break-off trenches 503. By way of example, the substrate 501 is made of polyester, the squares 502 are squares of 20×20 micron with a logo "JDSU" impressed therein for the purpose of tracking orientation of the squares in a coating. The substrate 501 may have a different, not necessarily square, pattern of tranches 503, as it will be discussed further with reference to FIGS. 9A-C.

The releasable coating formed during the coating step 530 includes one or more magnetic layers and, optionally, non-magnetic layers as it will be discussed further with reference to FIGS. 10 and 11. The non-magnetic layers may be deposited using any conventional thin film deposition techniques. Non-limiting examples of such techniques include physical vapor deposition (PVD), chemical vapor deposition (CVD), plasma enhanced (PE) variations thereof, such as PECVD or downstream PECVD, sputtering, electrolytic deposition, sol-gel, and other like deposition methods that lead to the formation of substantially uniform continuous thin film layers. For deposition of the magnetic layer, these techniques are performed as described below.

In one embodiment of the method, the coating step 530 includes deposition of the magnetic layer using at least two sources for providing magnetic material to a same portion of the substrate at different angles.

Figure 4A:
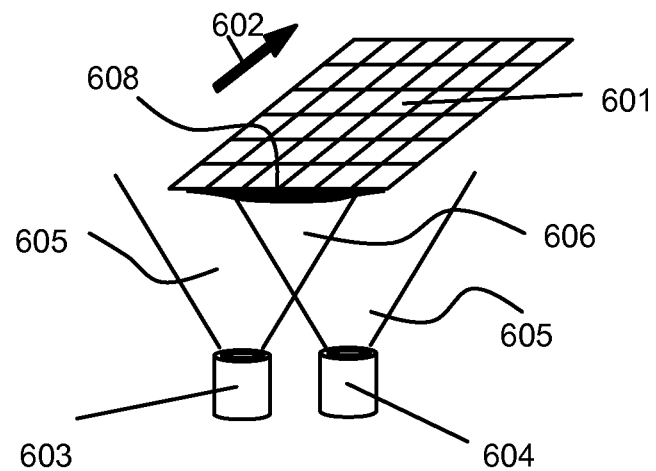
FIG. 4A is an illustration of a magnetic material deposition according to one embodiment of the instant invention.
Figure 4B:
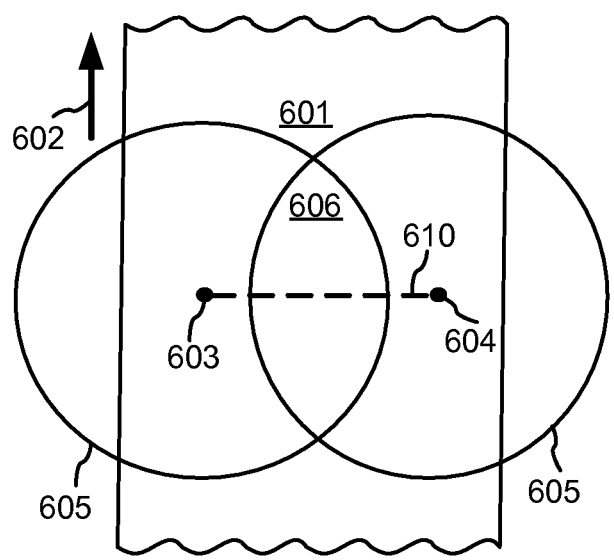
FIG. 4B is a plan view of the substrate shown in FIG. 4A.

By way of example, in one embodiment of the method, the coating step 530 includes deposition of the magnetic layer using at least two sources for providing magnetic material to a same portion of a moving substrate simultaneously at two, or more, different angles. FIGS. 4A and 4B schematically illustrate deposition of a magnetic material on the surface of a substrate 601 moving in a direction 602. The magnetic material is provided to the substrate 601 simultaneously from two magnetic material sources 603 and 604 disposed so that a line 610 connecting the magnetic material sources 603 and 604 is substantially orthogonal to the direction 602. A charge of the magnetic material is placed into the magnetic material sources 603 and 604, or crucibles, and heated. As the temperature of the charge rises, its vapor pressure increases also, resulting in a significant evaporation rate. The vapor of the magnetic material leaves the crucibles in two streams 605 and goes predominantly toward the substrate 601. The streams 605 intersect in a zone 606 within the vacuum chamber in close proximity to the substrate 601. The evaporant condenses on the cold substrate 601 producing a magnetic thin film layer 608 underneath the substrate 601. The two overlapping vapor streams 605 come to a portion of the substrate 601 simultaneously at two different angles. It is our understanding that they provide nucleation and growth of the magnetic material creating a microcrystalline structure of grains of the condensate such that the magnetic layer 608 acquires an in-plane magnetic anisotropy in the direction 602 orthogonal to the line connecting the evaporation sources 603 and 604. The deposited removable coating including the magnetic layer 608 is then stripped off the substrate 601 and ground-broken along the trenches 503 shown in FIG. 3A into individual square-shaped flakes. As a result, a magnetic layer of an individual flake has a microcrystalline or a domain structure providing a magnetic anisotropy oriented substantially parallel to one side of the square and orthogonal to another side of the square.

Figure 5A:
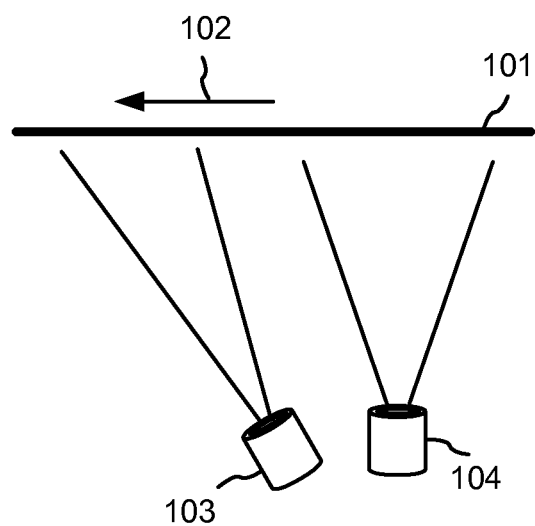
FIG. 5A is a side view illustration of a magnetic material deposition according to one embodiment of the instant invention.
Figure 5B:
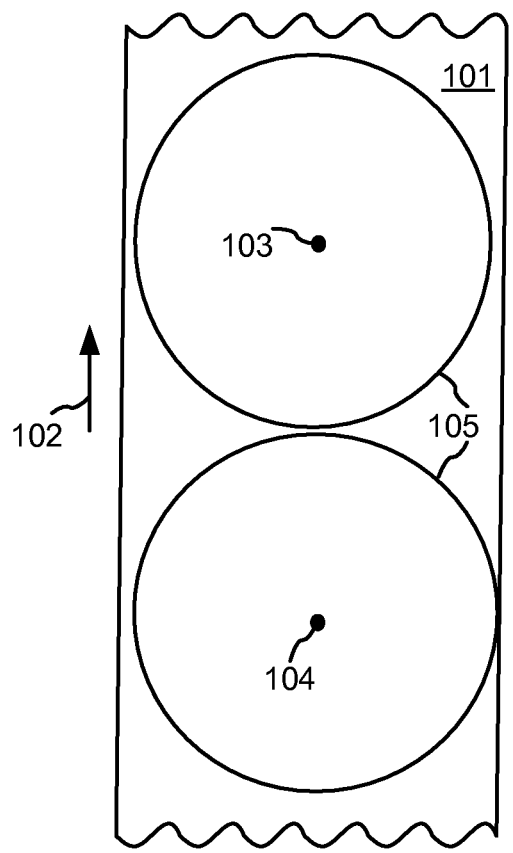
FIG. 5B is a plan view of the substrate shown in FIG. 5A.

In one embodiment of the method, the coating step 530 includes deposition of the magnetic layer illustrated in FIGS. 5A and 5B. At least two sources of magnetic material are used for providing the magnetic material to a same portion of the substrate at different angles, wherein two or more sources of the magnetic material 103 and 104 are disposed along the direction 102 of the substrate's movement and oriented at different angles with respect to the substrate 101, so that two evaporation streams 105 reach a portion of the substrate 101 at different angles at different times.

Figure 6A:
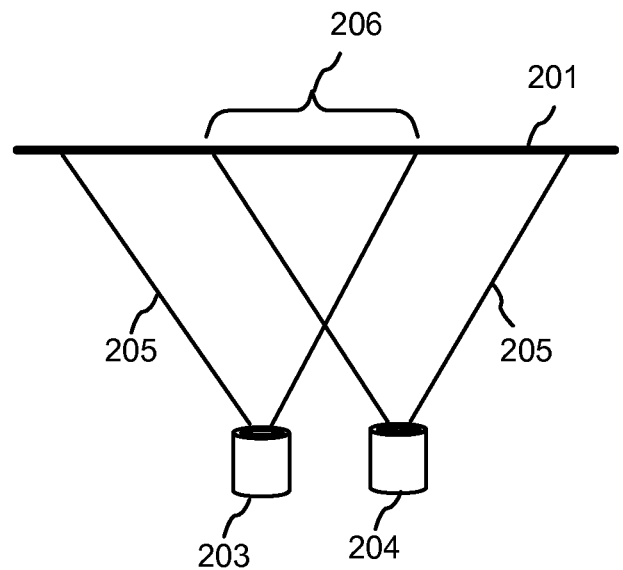
FIG. 6A is a side view illustration of a magnetic material deposition according to one embodiment of the instant invention.
Figure 6B:
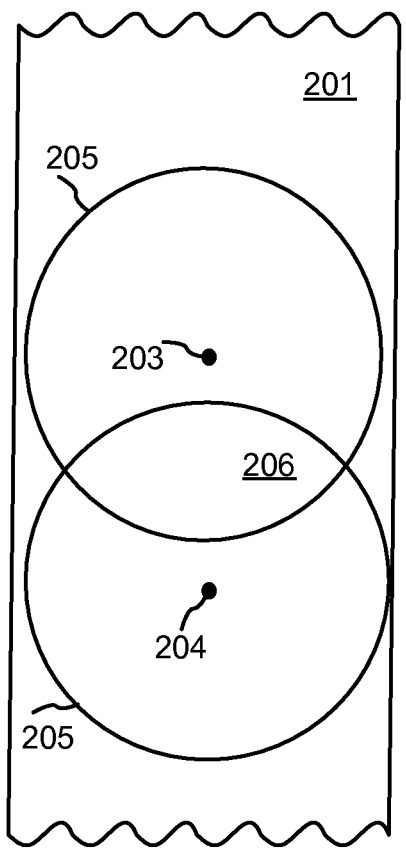
FIG. 6B is a plan view of the substrate shown in FIG. 6A.

In one embodiment of the method, the coating step 530 includes deposition of the magnetic layer onto a static substrate as illustrated in FIGS. 6A and 6B. Two or more sources of the magnetic material 203 and 204 create overlapping vapor streams 205 reaching the substrate 201 in a region 206 so as to provide magnetic material to a same portion of the substrate at two different angles. Alternatively, the substrate 201 shown in FIGS. 6A and 6B can move.

In one embodiment of the method, the substrate is moving during the deposition of magnetic layer in the coating step 530, preferably in the direction of the desired magnetic anisotropy.

Figure 7:
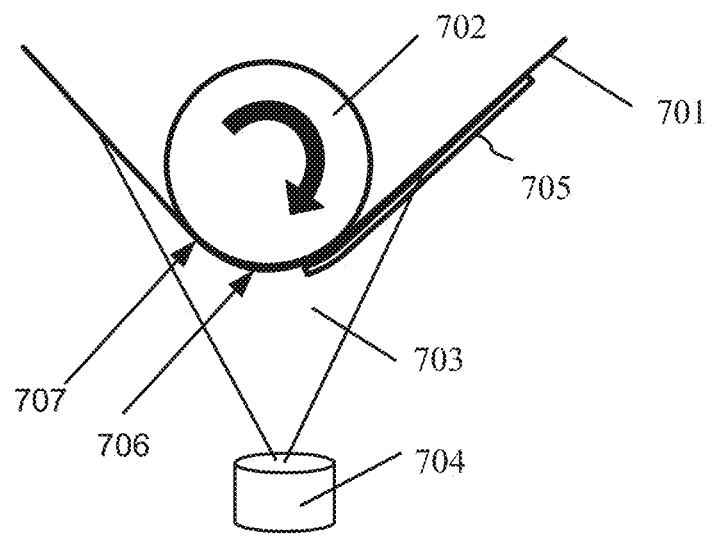
FIG. 7 is a side view illustration of a magnetic material deposition according to one embodiment of the instant invention.

In one embodiment of the method, the coating step 530 includes deposition of the magnetic material onto a curved substrate as illustrated in FIG. 7. The substrate 701, which is partially wrapped around a roller 702 inside of a roll-coater. A stream of the magnetic material 703 comes from a source of the magnetic material 704 such as an e-gun. A shield 705 prevents deposition of the material on the curved substrate 701 before it comes to the roller 702. Because of the substrate's curved surface, a same portion of the substrate 701 moving through the evaporated stream 703 receives the magnetic material at substantially different angles. It has been proven experimentally, that a layer of the magnetic material deposited on the substrate 701 has a magnetic anisotropy oriented along the direction of the substrate's movement, since flakes made by removing a releasable coating from the substrate and breaking it apart exhibited side-by-side alignment when subjected to an external magnetic field.

Of course, features of different embodiments described herein can be combined. By way of example, the method embodiment shown in FIG. 4A may use the substrate 601 bent as shown in FIG. 7.

In one embodiment of the method, the coating step 530 includes annealing of the magnetic material in a magnetic field for providing an anisotropy in a desired direction. In another embodiment, the ion bombardment of the freshly deposited magnetic layer used for the same purpose. By way of example, Xe-ion-irradiation of the magnetic material taught by Kun Zhang in "Stress induced magnetic anisotropy of Xe-ion-irradiated Ni thin films", Nucl. Instr. And Meth. In Phys. Res., B 243 (2006), 51-57, incorporated herein by reference. The bombardment causes physical changes of the microstructure structure of the magnetic material producing strain.

The method described herein with reference to FIG. 3B provides magnetic flakes having a predefined two-dimensional shape and a magnetic anisotropy oriented in a desired direction, which may be different from the direction of the longest planar dimension of the shape. Anisotropic magnetic flakes of the instant invention have a thickness in the range of 50 nm to 10 microns and a two-dimensional shape 900 having a diameter, i.e. a greatest distance between two points of the shape 900, in the range of 1-500 microns.

In one embodiment of the instant invention, the flakes manufactured using the aforedescribed method are non-grated, reflective, anisotropic, magnetic flakes for forming a reflective coating. The flakes have a particular shape and a magnetic anisotropy so as to enable forming ribbons when dispersed in a liquid carrier and impacted with an external magnetic field. The flakes include two reflector layers and a magnetic layer therebetween, and have a smooth surface absent of a grating, however indicia may be present. The indicia may include symbols, logos. etc. Preferably, the indicia is symmetrical with respect to a direction of the in-plane magnetic anisotropy. By way of example, letters "B," "C," "D" and numerals "3" and "8" have a horizontal symmetry axis. Anisotropic magnetic flakes with such letters, where a direction of magnetic anisotropy coincides with the direction of the horizontal symmetry axis, form ribbons with side-by-side letters. The letters are easily readable under magnification without turning a substrate supporting the ribbons or changing the observation angle. Letters "I," "A," "H," "W," "V," "O," etc., have a vertical symmetry axis. If the magnetic anisotropy of the flakes coincides with the vertical symmetry axis, the letters on the ribbons are easily readable one letter under another. In a coating comprising different flakes having an indicia, it is preferable to have a majority of the flakes being anisotropic magnetic flakes with a symmetrical indicia, all having a same, vertical or horizontal symmetry axis, so as to form ribbons easily identifiable on a document. Preferably, the amount of anisotropic flakes with a symmetrical indicia is at least 70% of all the flakes, and more preferably at least 90%. In one embodiment, a coating contains anisotropic flakes with asymmetrical indicia, such that the flakes have a hydrophobic coating on one side of the flake as taught in U.S. Patent Application Pub. No. US 2008/0233401 for desirable orientation of the flakes; ribbons of such flakes are also easily readable under magnification without turning the document.

Figure 9A:
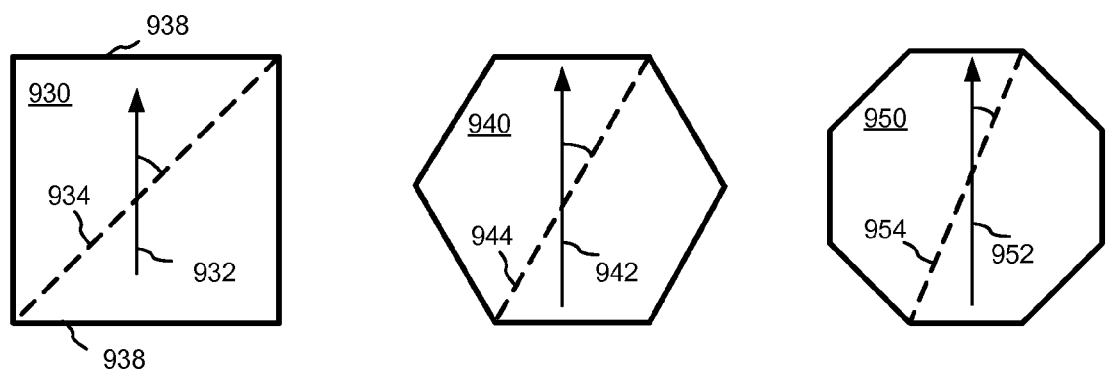
FIG. 9A is a simplified plan view of shaped flakes.
Figures 9B, 9C:
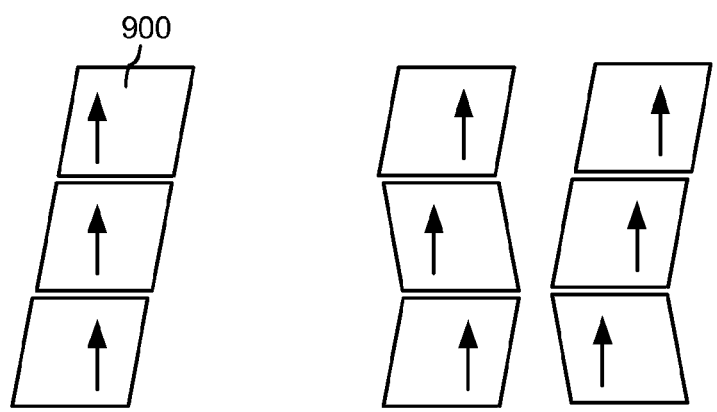
FIG. 9B is a simplified plan view of a ribbon formed by flakes of the instant invention with a hydrophobic coating.
FIG. 9C is a simplified plan view of ribbons formed by flakes of the instant invention without a hydrophobic coating.

With reference to FIGS. 9A-C, the flakes have a two-dimensional shape with two sides substantially parallel to one another, for example a square 930 has two parallel sides 938. The flakes are manufactured so as to have a magnetic anisotropy in a direction 932 substantially orthogonal to the two mutually parallel sides 938. When such flakes are dispersed in a liquid carrier and impacted with an external magnetic field, they form ribbons such as shown in FIG. 2.

Preferably, the flakes have a square shape, but rectangles with unequal sides, parallelograms 900, hexagons 940, octagon 950, and any other shape having two sides substantially parallel to one another, are suitable for forming ribbons. The direction of the magnetic anisotropy 932, 942, or 952, forms with the longest planar dimension 934, 944, or 954, respectively, an angle of at least 20 degrees.

Depending on the two-dimensional shape, some flakes would require a hydrophobic coating for turning up the right surface of the flake as taught in U.S. application Ser. No. 12/051,164 filed Mar. 19, 2008, 241, incorporated herein by reference. By way of example, parallelogram-shaped magnetic flakes 900 with a hydrophobic coating on one surface of the flake form better ordered ribbons shown in FIG. 9B than flakes without such a coating, as shown in FIG. 9C.

The magnetic layer can be formed of any magnetic material, such as ferromagnetic and ferrimagnetic materials, including nickel, cobalt, iron, gadolinium, terbium, dysprosium, erbium, and their alloys or oxides. For example, a cobalt nickel alloy can be employed, with the cobalt and nickel having a ratio by weight of about 80% and about 20%, respectively. This ratio for each of these metals in the cobalt nickel alloy can be varied by plus or minus about 10% and still achieve the desired results. Thus, cobalt can be present in the alloy in an amount from about 70% to about 90% by weight, and nickel can be present in the alloy in an amount from about 10% to about 30% by weight. Other examples of alloys include Fe/Si, Fe/Ni, FeCo, Fe/Ni/Mo, and combinations thereof. Hard magnetics of the type SmCo5, NdCo5, Sm2Co17, Nd2Fe14B, Sr6Fe2O3, TbFe2, Al—Ni—Co, and combinations thereof, can also be used as well as spinel ferrites of the type Fe3O4, NiFe2O4, MnFe2O4, CoFe2O4, or garnets of the type YIG or GdIG, and combinations thereof. The magnetic material may be selected for its reflecting or absorbing properties as well as its magnetic properties. When utilized to function as a reflector, the magnetic material is deposited to a thickness so that it is substantially opaque. When utilized as an absorber, the magnetic material is deposited to a thickness so that it is not substantially opaque. A typical thickness for the magnetic material when utilized as an absorber is from about 2 nm to about 20 nm.

The magnetic layer may be formed by a material having magnetic and non-magnetic particles, or magnetic particle within non-magnetic medium, for example cobalt-doped zinc oxide film deposited using the sol-gel technology.

Although this broad range of magnetic materials can be used, the "soft" magnets are preferred. As used herein, the term "soft magnets" refers to any material exhibiting ferromagnetic properties but having a remanence that is substantially zero after exposure to a magnetic force. Soft magnets show a quick response to an applied magnetic field, but have very low (coercive fields (Hc)=0.05-300 Oersteds (Oe)) or zero magnetic signatures, or retain very low magnetic lines of force after the magnetic field is removed. Similarly, as used herein, the term "hard magnets" (also called permanent magnets) refers to any material that exhibits ferromagnetic properties and that has a long lasting remanence after exposure to a magnetizing force. A ferromagnetic material is any material that has a permeability substantially greater than 1 and that exhibits magnetic hysteresis properties.

Preferably, the magnetic materials used to form magnetic layers in the flakes and foils of the invention have a coercivity of less than about 2000 Oe, more preferably less than about 300 Oe. Coercivity refers to the ability of a material to be demagnetized by an external magnetic field. The higher the value of coercivity, the higher the magnetic field required to de-magnetize the material after the field is removed. The magnetic layers used are preferably "soft" magnetic materials (easily demagnetized), as opposed to "hard" magnetic materials (difficult to demagnetize) which have higher coercivities. The coercivities of the foils, pigments or colorants of the magnetic color shifting designs according to the invention are preferably in a range of about 50 Oe to about 300 Oe. These coercivities are lower than in standard recording materials. The use of soft magnetic materials in pigment flakes allows for easier dispersion of the flakes without clumping.

The magnetic layer can be formed to have a suitable physical thickness of from about 200 angstroms to about 10,000 angstroms, and preferably from about 500 to about 1,500 angstroms. However, it will be appreciated by those skilled in the art, in view of the disclosure herein, that the optimal magnetic thickness will vary depending on the particular magnetic material used and the purpose for its use.

Anisotropic magnetic flakes have one or more substantially continuous thin-film layers, including a magnetic layer having a magnetic anisotropy oriented as discussed above. Optical design of the flakes can be different. The flakes can be silver-like with one of the following structures: M, R/M, R/M/R, M/D/M, M/D/R, D/R/M/R/D (where M is magnetic metal, R is reflective material and D is supportive or dielectric material) or any other combination of a magnetic layer, reflective layer and a supportive layer. With reference to FIG. 10, the anisotropic reflective magnetic flakes (RMF) 20 include two reflector layers 24 and 26 on both major surfaces of a magnetic layer 22 having anisotropy as discussed above. The reflector layers 24 and 26 can be composed of various reflective materials. Presently preferred materials are one or more metals, one or more metal alloys, or combinations thereof, because of their high reflectivity and ease of use, although non-metallic reflective materials could also be used. Nonlimiting examples of suitable metallic materials for the reflector layers include aluminum, silver, copper, gold, platinum, tin, titanium, palladium, nickel, cobalt, rhodium, niobium, chromium, and combinations or alloys thereof. The reflector layers can be formed to have a suitable physical thickness of from about 40 to about 2,000 nm, and preferably from about 60 to about 1,000 nm. The reflector layers have a reflectivity of at least 40% and preferably higher than 60%.

Figure 10:
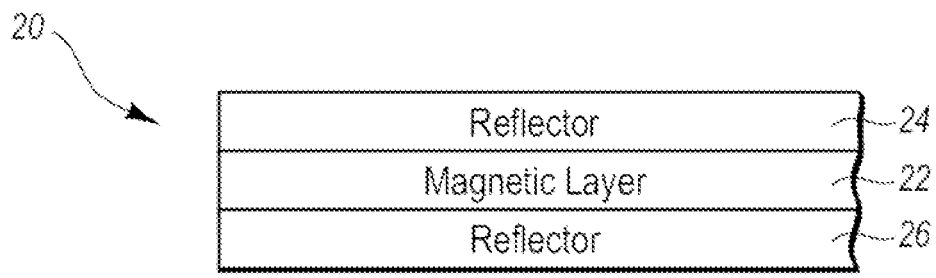
FIGS. 10 and 11 are simplified cross sections of flakes according to embodiments of the present invention.

Optionally, the anisotropic reflective magnetic flakes include two protective layers disposed on the reflector layers, not shown in FIG. 10; the protective layers are dielectric layers formed of such materials as zinc sulfide (ZnS), zinc oxide (ZnO), zirconium oxide (ZrO2), titanium dioxide (TiO2), diamond-like carbon, indium oxide (In2O3), indium-tin-oxide (ITO), tantalum pentoxide (Ta2O5), ceric oxide (CeO2), yttrium oxide (Y2O3), europium oxide (Eu2O3), iron oxides such as (II) diiron(III) oxide (Fe3O4) and ferric oxide (Fe2O3), hafnium nitride (HfN), hafnium carbide (HfC), hafnium oxide (HfO2), lanthanum oxide (La2O3), magnesium oxide (MgO), neodymium oxide (Nd2O3), praseodymium oxide (Pr6O11), samarium oxide (Sm2O3), antimony trioxide (Sb2O3), silicon monoxide (SiO), selenium trioxide (Se2O3), tin oxide (SnO2), tungsten trioxide (WO3), combinations thereof, and the like.

Figure 11:
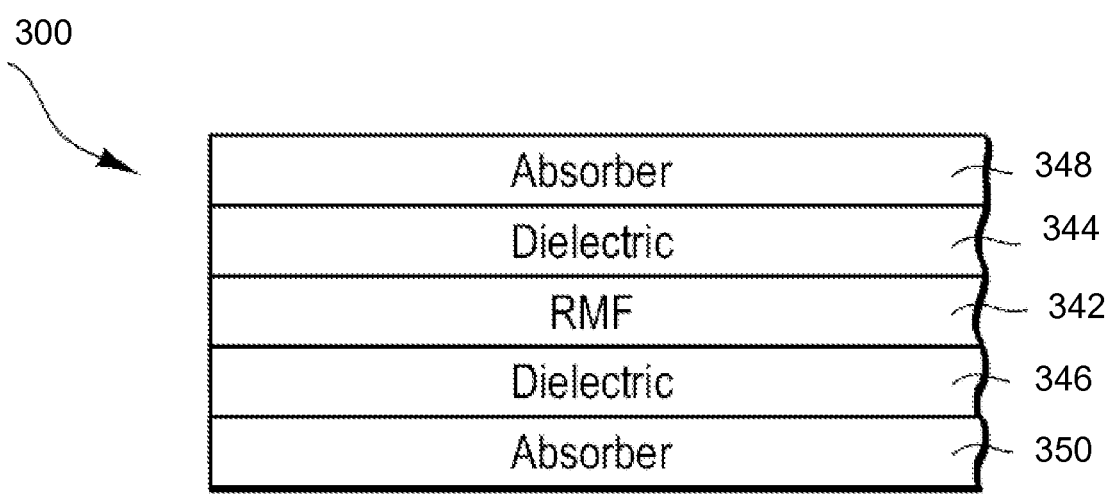

Optionally, the anisotropic reflective magnetic flakes of the instant invention are color-shifting flakes 300 shown in FIG. 11, including an RMF 342 formed of a magnetic layer and two reflector layers on two surfaces of the magnetic layer, two dielectric layers 344 and 346 supported by the reflector layers of the RMF 342, and two absorber layers 348 and 350 supported by the dielectric layers 344 and 346, for providing a color-shifting optical effect. Materials suitable for the magnetic, reflector and dielectric layers are the same as listed above with reference to FIG. 10. The coatings formed using the color-shifting flakes 300 are highly-reflective, color-shifting coatings with ribbons formed therein.

Nonlimiting examples of suitable absorber materials include metallic absorbers such as chromium, aluminum, nickel, silver, copper, palladium, platinum, titanium, vanadium, cobalt, iron, tin, tungsten, molybdenum, rhodium, and niobium, as well as their corresponding oxides, sulfides, and carbides. Other suitable absorber materials include carbon, graphite, silicon, germanium, cermet, ferric oxide or other metal oxides, metals mixed in a dielectric matrix, and other substances that are capable of acting as a uniform or selective absorber in the visible spectrum. Various combinations, mixtures, compounds, or alloys of the above absorber materials may be used to form the absorber layers of flake 300.

Examples of suitable alloys of the above absorber materials include Inconel (NiCr—Fe), stainless steels, Hastalloys (e.g., Ni—Mo—Fe; Ni—Mo—Fe—Cr; Ni—Si—Cu) and titanium-based alloys, such as titanium mixed with carbon (Ti/C), titanium mixed with tungsten (Ti/W), titanium mixed with niobium (Ti/Nb), and titanium mixed with silicon (Ti/Si), and combinations thereof. As mentioned above, the absorber layers can also be composed of an absorbing metal oxide, metal sulfide, metal carbide, or combinations thereof. For example, one preferred absorbing sulfide material is silver sulfide. Other examples of suitable compounds for the absorber layers include titanium-based compounds such as titanium nitride (TiN), titanium oxynitride (TiNxOy), titanium carbide (TiC), titanium nitride carbide (TiNxCz), titanium oxynitride carbide (TiNxOyCz), titanium silicide (TiSi2), titanium boride (TiB2), and combinations thereof. In the case of TiNxOy and TiNxOyCz, preferably $x=0$ to 1, $y=0$ to 1, and $z=0$ to 1, where $x+y=1$ in TiNxOy and $x+y+z=1$ in TiNxOyCz. For TiNxCy, preferably $x=0$ to 1 and $z=0$ to 1, where $x+z=1$. Alternatively, the absorber layers can be composed of a titanium-based alloy disposed in a matrix of Ti, or can be composed of Ti disposed in a matrix of a titanium-based alloy.

Optionally, a ribbon-forming anisotropic magnetic flake has a magnetic layer, by way of example, formed of nickel, having a shape and anisotropy as discussed above, which does not support any reflector layers. However, at least one reflector layer is desirable for providing a higher reflectivity of the coating.

To compare magnetic properties of conventional flakes and flakes of the instant invention, two types of flakes have been manufactured.

Figure 8A:
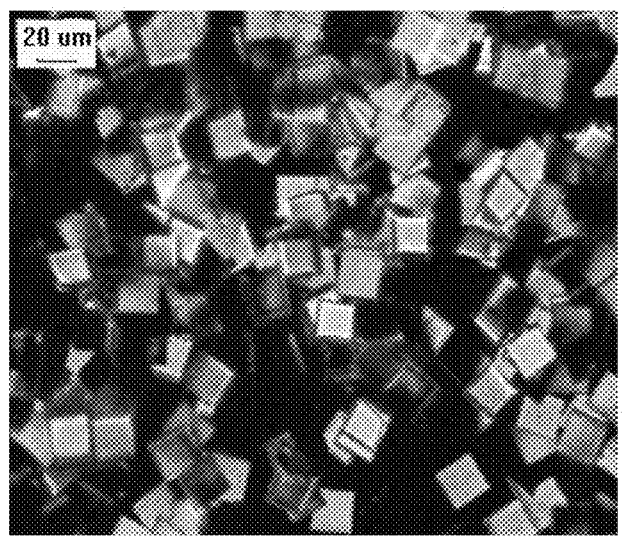
FIG. 8A is a microscopic image of randomly aligned conventional flakes in absence of a magnetic field.
Figure 8B:
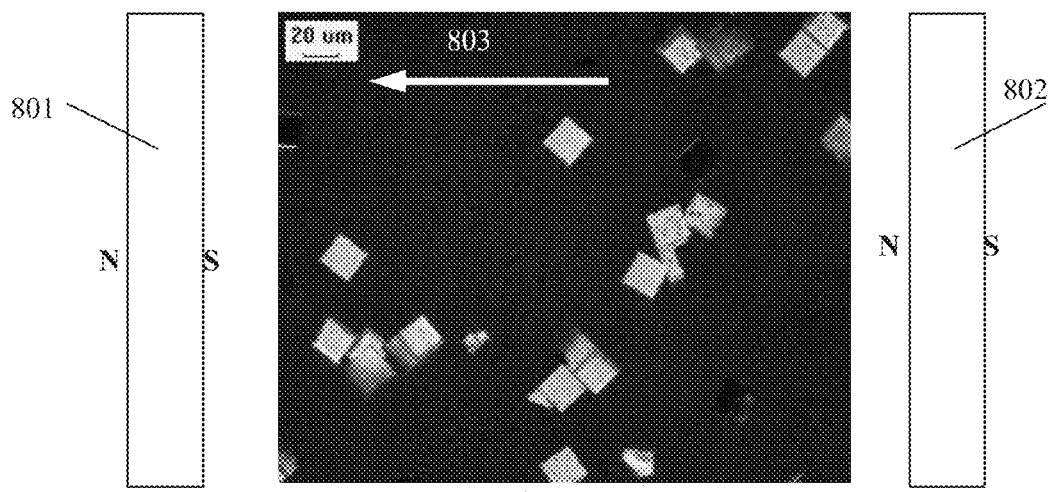
FIG. 8B is a microscopic image of conventional flakes in a magnetic field.

Using a conventional method, a web substrate patterned as shown in FIG. 3, was coated with a releasable thin-film coating MgF$_2$/Al/Ni/Al/MgF$_2$ in a batch coater. The deposited coating was stripped off the substrate and ground until all particles were broken along break-off trenches 503. The resulting flakes were mixed with transparent UV-curable ink vehicle in concentration of 20 wt % to produce a magnetic pigment. The ink was screen-printed on a paper card and cured in UV light. A microscopic image in FIG. 8A illustrates a random alignment of the flakes. Additionally, flakes of the same type were mixed with the ink vehicle in a smaller concentration (2 wt %), printed onto another paper card and inserted between two permanent magnets 801 and 802 as illustrated in FIG. 8B, wherein the flakes aligned to have their diagonals substantially along the field direction 803.

Figure 8C:
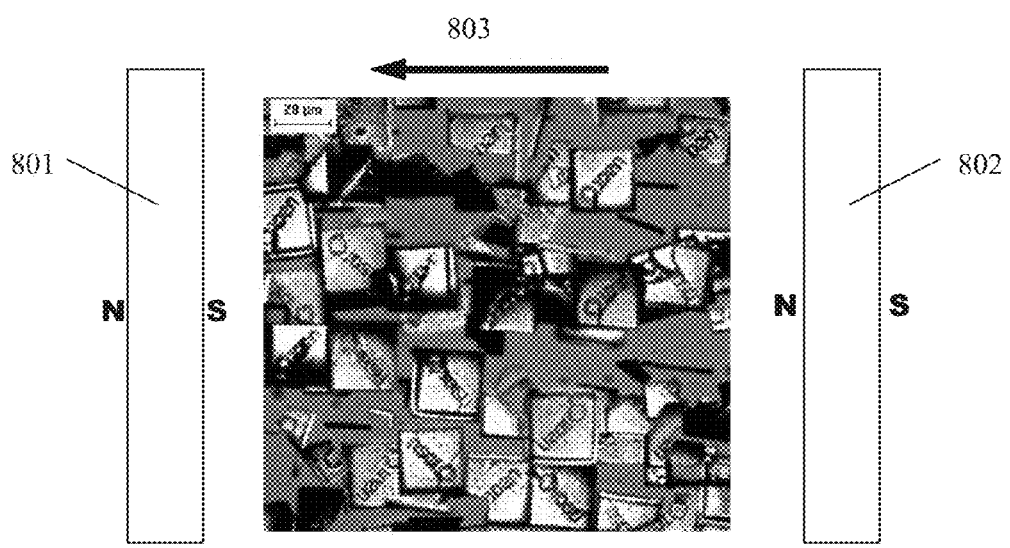
FIG. 8C is a microscopic image of anisotropic magnetic flakes of the instant invention in a magnetic field; concentration of the flakes in a carrier is 10 wt %.

Non-grated, anisotropic, reflective, magnetic flakes were manufactured using a method of the instant invention illustrated in FIGS. 4A and 4B, wherein the substrate 601 was arched in a roll coater as shown in FIG. 7. A releasable coating MgF$_2$/Al/Ni/Al/MgF$_2$ have been deposited on the substrate, then stripped off the substrate and ground until all platelets were broken into squares. The resulting flakes were mixed with the same ink vehicle in the concentration of 10 wt % and printed on a paper card. As illustrated in FIG. 8C, a wet print containing magnetic flakes was placed between two magnets 801 and 802. The direction of an applied magnetic field is indicated by the arrow 803. The flakes, in accordance with the instant invention manufactured to have a magnetic moment in the direction of one side of the square, aligned with their sides parallel to the direction of applied magnetic field 803. An increase of the flake concentration allows their assembly in long ribbon shown in FIG. 8D. A further increase of concentration brings the flakes close to each other (FIG. 8E) forming a highly reflective coating on a paper card.

The non-grated, anisotropic, reflective, magnetic flakes of the instant invention, also referred herein as reflective flakes, are designed for forming a highly reflective coating, in particular desirable in the printing industry. A conventional method of increasing reflectivity of a metallic pigment includes surface modification of a metal flake by surfactants, such as fatty acids. The surfactants reduce the surface energy of the flake and make it float to the surface of the coating. However, the surfactants substantially reduce the abrasion wear of the coating. Magnetically oriented square flakes, assembled in long ribbons and often extending across the entire printed insignia parallel to the surface of the ink, fully utilize the total reflective surface of the pigment. Optionally, the coating provides a color-shifting effect if the flakes are color-shifting anisotropic reflective magnetic flakes. The reflective flakes have a substantially smooth surface for providing high specular reflectivity of the coating. The flakes have no grating, but may have indicia thereon.

It has been taught in US Patent Application No. 20060263539 published Nov. 23, 2006, to Argoitia, which is incorporated herein by reference, that magnetic flakes with a diffractive grating or a magnetic layer formed of separate stripes orient so as to align grating grooves or stripes along the lines of the applied magnetic field. However, it has been not known so far how to align smooth-surface flakes having a continuous magnetic layer so as to have a side parallel to a direction of an external magnetic field. Also, it has not been known how to assemble flakes in long, flat ribbons of equal width.

To form a reflective coating, a carrier and a plurality of flakes dispersed therein are provided to a surface of an object and then a magnetic field is applied for orientation of the flakes parallel to the surface of the coating.

Carriers are typically liquid for a period to permit some motion of the flake before the carrier evaporates or hardens. For example, ink might have a volatile carrier that evaporates to fix the flake, or a clear paint carrier, such as a clear paint base, might harden to fix the flake. Similarly, uncured thermosetting resin or heated thermoplastic resin might allow the flake to be oriented prior to curing or cooling, respectively, either before, during, or after application to a surface. By way of example, the carrier is an acrylic resin based carrier; other carriers are readily known to one skilled in the art.

Examples of carriers include polyvinyl alcohol, polyvinyl acetate polyvinylpyrrolidone, poly(ethoxyethylene), poly (methoxyethylene), poly(acrylic) acid, poly(acrylamide), poly(oxyethylene), poly(maleic anhydride), hydroxyethyl cellulose, cellulose acetate, poly(saccharides) such as gum arabic and pectin, poly(acetals) such as polyvinylbutyral, poly(vinyl halides) such as polyvinyl chloride and polyvinylene chloride, poly(dienes) such as polybutadiene, poly (alkenes) such as polyethylene, poly(acrylates) such as polymethyl acrylate, poly(methacrylates) such as poly methylmethacrylate, poly(carbonates) such as poly(oxycarbonyl oxyhexamethylene, poly(esters) such as polyethylene terephtalate, poly(urethanes), poly(siloxanes), poly(sulphides), poly(sulphones), poly(vinylnitriles), poly(acrylonitriles), poly(styrene), poly(phenylenes) such as poly(2,5 dihydroxy-1,4-phenyleneethylene), poly(amides), natural rubbers, formaldehyde resins, other polymers and mixtures of polymers, polymers with solvents, as well as photopolymers.

To ensure that a coating has a high reflectivity of at least 40%, the flakes have reflector layers having reflectivity of greater than 50% and, preferably, greater than 60%, and the flakes have a specific shape and magnetic anisotropy for tiling a surface of the coated object with flakes adjacent to one another substantionally leaving no surface open, provided a concentration of the flakes is high enough.

Figure 8D:
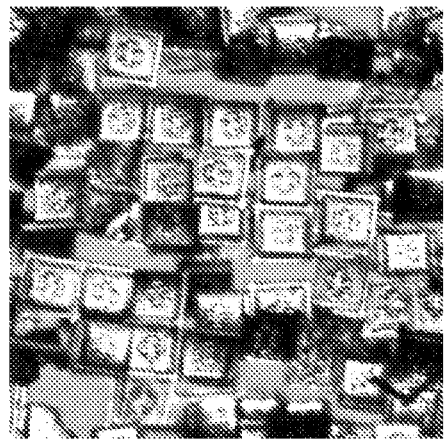
FIG. 8D is a microscopic image of anisotropic magnetic flakes of the instant invention forming ribbons in a magnetic field.
Figure 8E:
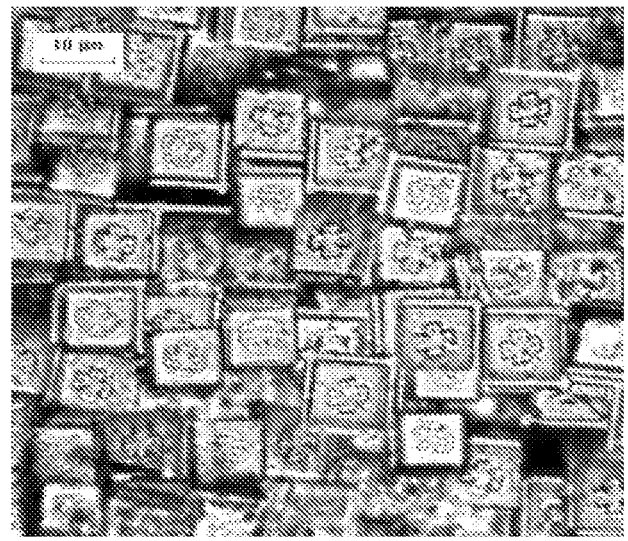
FIG. 8E is a microscopic image of anisotropic magnetic flakes of the instant invention forming a highly reflective coating in a magnetic field.

Due to the specific shape and magnetic anisotropy, a portion of the flakes attract to each other side-by-side and form one or more ribbons as discussed above with reference to FIG. 2 and shown in FIG. 8D. The ribbons are understood to have at least three flakes adjacent side-by-side with gaps between the flakes of no greater than 500 nm. No gaps were noticed for the flakes in the size range of 1-20 microns. When the flakes have a size in the range of 20-500 microns, the gap size varies from zero to 500 nm. Of course, formation of the ribbons depends on a concentration of the flakes in the carrier.

To form a highly reflective coating, almost all of the object's surface under the coating should be covered with reflective flakes leaving no or little space between the flakes where the coating has lower local reflectivity corresponding to reflectivity of the carrier on the object's surface in absence of reflective flakes. Accordingly, an aggregate surface of the flakes, i.e. a sum of all flake surfaces turned to an observer, is equal to at least 80% of the surface's area under the coating. Preferably, the aggregate surface of the flakes is greater than 90% of the surface's area under the coating. Such concentration of the flakes provides substantially total coverage of the object's surface with ribbons of the flakes forming substantially a tile array of flakes shown in FIG. 8E. The tile array is understood as including at least two ribbons adjacent to one another so as to be side-by-side with gaps between the ribbons of no greater than 4 microns.

To provide such coverage using conventional flakes, a thick coating with multiple levels of flakes is required so that flakes of a next level partially cover gaps between randomly dispersed flakes of previous levels. Additionally, a high concentration of flakes is associated a higher probability of flakes overlapping and with a higher cost of the coating. Advantageously, the flakes of the instant invention provide a thin, cost-effective, highly-reflective coating. Furthermore, flakes aligned in a ribbon provide a security feature to the object with no extra cost or effort. The ribbons can be used for authentication of the object. A conventional image recognition technique applied to the image reflected by the coating so as to indentify whether any ribbons are present therein.

In one embodiment, anisotropic, reflective, magnetic flakes with a non-periodic linear grating are dispersed in a carrier for forming a coating with well-defined ribbons, which may be used as a security feature. The flakes with a non-periodic linear grating have the same layered structure and two-dimensional shape as the non-diffractive, anisotropic, reflective, magnetic flakes described above. The flakes of this embodiment may be reflective or a color-shifting, they have a non-symmetric and non-periodic structure of the grating that reduces presence of diffractive colors.

A grating is any regularly spaced collection of essentially identical, parallel, elongated elements. In some instances, the grating can be non-periodic non-regularly spaced collection of non-identical parallel elongated elements. Gratings can be diffractive, holographic, reflective, binary, etc. A grating can also be a picture having characteristics of a grating. Holographic gratings are widely used for fabrication of holograms in packaging industry, for security applications and in the art. Diffractive gratings are also used for packaging. Diffractive flakes are fabricated by deposition of an optical stack onto a surface of a substrate with a diffractive grating. These flakes provide diffractive colors when illuminated by light. Magnetic diffractive flakes orient themselves with their grating parallel to the direction of applied magnetic field. Being dispersed in ink and aligned in the magnetic field, the shapeless diffractive flakes of different sizes form chains similar to one shown in FIG. 1B.

Figure 12:
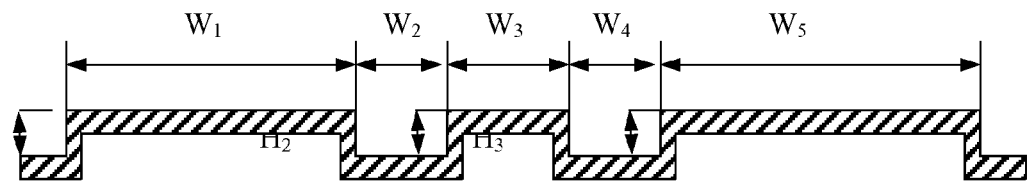
FIG. 12 is a cross section of a magnetic flake with a reflective grating.
Figure 13:
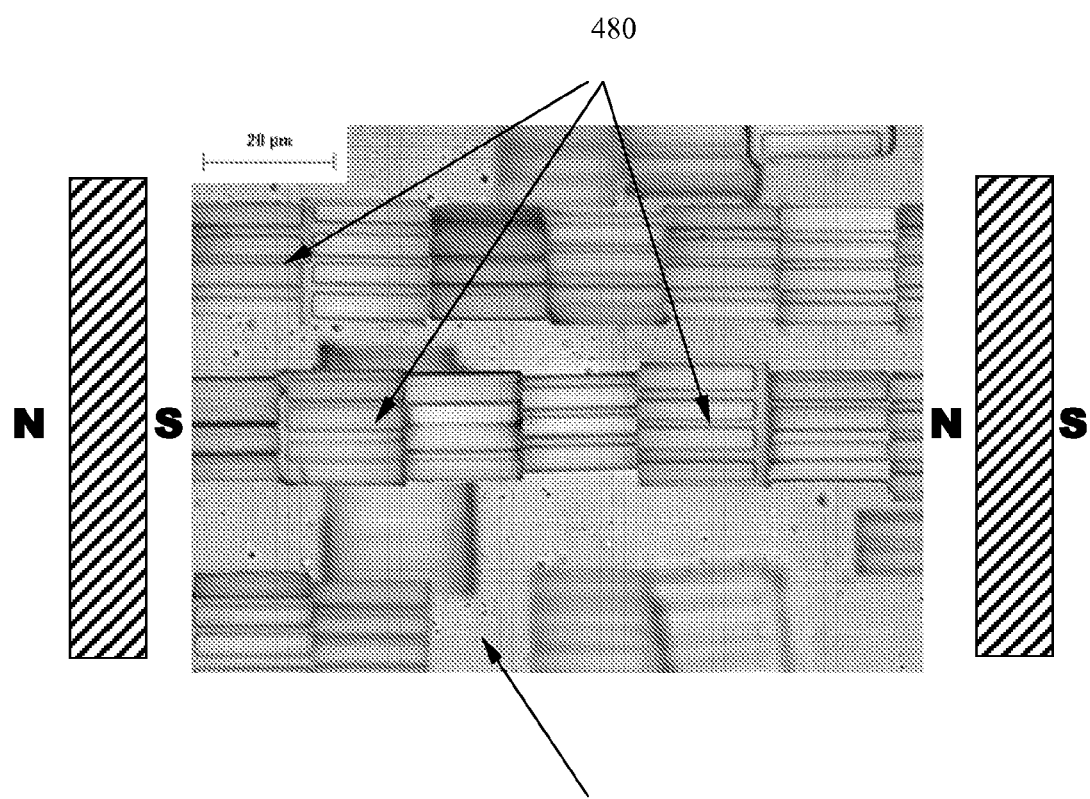
FIG. 13 is a microphotograph of ribbon-like structures.

Magnetic flakes with reflective gratings are illustrated in FIG. 12. The widths of the elements of the grating are not equal to each other: $W_1 \neq W_2 \neq W_3 \neq W_4 \neq W_5$ as well as their heights: $H_2 \neq H_3$. A single pigment flake needs just a few (usually from one to four) grooves to provide flake orientation in the field. The size of the flake can be in the range of 2×2 microns to 200×200 microns. The heights (FIG. 12) of the grating elements can be in the range of 10 nm to 100 nm. The widths of the grating elements can be in the range of 10 nm to 90 nm. Rectangular magnetic reflective grating flakes, all having a same shape, being dispersed in an ink vehicle and exposed to an external magnetic field, orient themselves along the direction of the field and assemble in long ribbon-like structures of an equal width as shown in FIG. 13.

The direction of the magnetic anisotropy is the direction of the non-periodic grating. Therefore, for forming ribbons in a coating, the anisotropic, reflective, magnetic flakes with a non-periodic grating have a two-dimensional shape with two sides substantially parallel to each other, and a non-periodic grating substantially orthogonal to the two sides.

A thin film composition $MgF_2/Al/Ni/Al/MgF_2$ was deposited on the top of structured substrate having embossed patterns of 20×20 micron squares. Every square consisted of four flat embossed elements (hills) and three narrow debossed (valleys) elements. The widths of the embossed and debossed elements were different to reduce the diffractive component of the light reflected from the flake. The coated structure was released from the substrate and ground. With reference to FIG. 13, the flakes were mixed with a transparent ink vehicle 470, silk screen printed on a transparent polyester card and exposed to the parallel magnetic field. The ink composition was solidified with UV lamp and microscopically analyzed. As shown in FIG. 13, square magnetic reflective flakes 480 form continuous, well-defined ribbons of constant width, often extending from one side of the printed coating to another.

Figure 14:
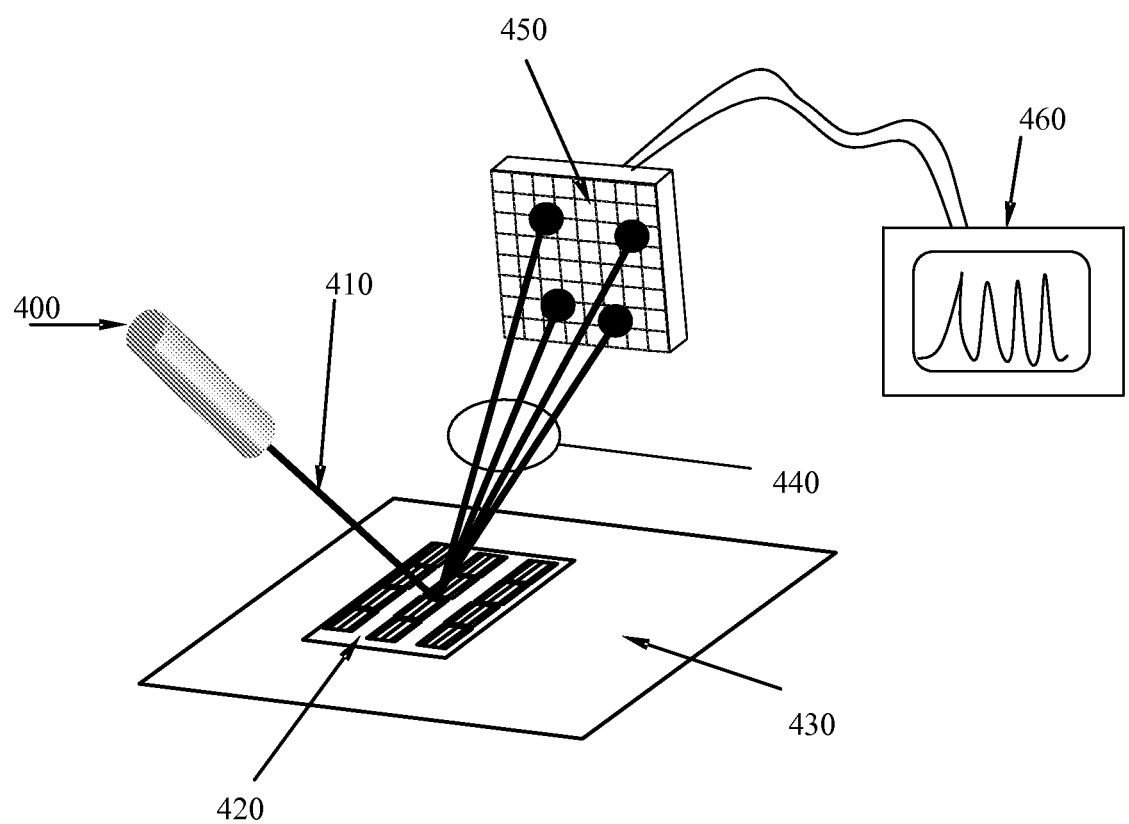
FIG. 14 is an illustration of a method of object authentication.

FIG. 14 illustrates a method of authentication of an object such as a bank note 430, which has a printed coating 420. The coating 420 includes diffractive, anisotropic, reflective, magnetic flakes with a binary (fanout) grating disclosed in U.S. application Ser. No. 12/107,152 filed Apr. 22, 2008, incorporated herein by reference. The flakes are coated with an oleophobic/hydrophobic material so as to be aligned on the surface of the ink. For identifying a ribbon and a pattern provided by the binary grating, a monochromatic beam of light 410 from a laser 400 illuminates the printed coating 420 containing ribbons. Reflected beams 440, forming a predetermined pattern, are received at an image sensor or CCD camera 450 connected to a computer 460 or a reader. The computer 460 decodes the pattern so as to authenticate the bank note 430.

We claim:
1. An anisotropic magnetic flake, for forming a reflective coating, comprising a two-dimensional layered structure having a thickness in a range of 50 nm to 10 microns and a longest planar dimension in a range of 1 micron to 500 microns, the two-dimensional layered structure comprising:

a continuous magnetic layer, absent of a grating, for aligning the anisotropic magnetic flake substantially parallel to a surface of the reflective coating when the anisotropic magnetic flake is disposed in a liquid carrier and under influence of an external magnetic field,
the continuous magnetic layer having a first surface and an opposing second surface; and
a first reflector layer disposed on the first surface and a second reflector layer disposed on the second surface, such that the continuous magnetic layer is contained therebetween,
wherein the continuous magnetic layer comprises a magnetic material having a coercivity of less than about 2000 Oe and has a structure that provides in-plane magnetic anisotropy oriented in a direction that is at an angle of at least 20 degrees relative to the longest planar dimension,
wherein the direction of the in-plane magnetic anisotropy is substantially orthogonal to two substantially parallel sides, of the two-dimensional layered structure, for alignment of the anisotropic magnetic flake side-by-side with one or more other anisotropic magnetic flakes of a same structure, and
wherein a gap between the anisotropic magnetic flake and an anisotropic magnetic flake, of the one or more other anisotropic magnetic flakes, is no greater than 500 nm.

2. The anisotropic magnetic flake of claim 1, wherein
the alignment occurs when the anisotropic magnetic flakes are disposed in the liquid carrier and under influence of an external magnetic field while forming the reflective coating.

3. The anisotropic magnetic flake of claim 1, wherein the two-dimensional layered structure has a rectangular shape with equal or unequal sides.

4. The anisotropic magnetic flake of claim 1, further comprising:
first and second dielectric layers supported by the first and second reflector layers, respectively, and first and second absorber layers supported by the first and second dielectric layers, respectively, for providing a color-shifting optical effect.

5. The anisotropic magnetic flake of claim 1, wherein
the one or more other anisotropic magnetic flakes include a plurality of anisotropic magnetic flakes,
a coating includes the anisotropic magnetic flake, the plurality of anisotropic magnetic flakes, and a solidified carrier,
all flakes, of the anisotropic magnetic flake and the plurality of anisotropic magnetic flakes, have a same two-dimensional shape with two sides thereof substantially parallel to each other, and
a portion of the anisotropic magnetic flake and the plurality of anisotropic magnetic flakes forms a ribbon of at least three anisotropic magnetic flakes adjacent to one another so as to be side-by-side with a each respective gap between each respective anisotropic magnetic flakes, of the anisotropic magnetic flake and the plurality of anisotropic magnetic flakes, being no greater than 500 nm.

6. The anisotropic magnetic flake of claim 5, wherein each respective gap is no greater than 4 micron, thereby forming a tile array of anisotropic magnetic flakes.

7. The anisotropic magnetic flake of claim 5, wherein
the coating is present on an object, and
the object is authenticated by identifying a ribbon within the coating.

8. The anisotropic magnetic flake of claim 5, wherein 70% of the plurality of anisotropic magnetic flakes in the coating have an indicium thereon.

9. The anisotropic magnetic flake of claim 1, wherein the first and second reflector layers have a reflectivity of greater than 60%.

10. The anisotropic magnetic flake of claim 1, wherein the anisotropic magnetic flake includes an indicium.

11. The anisotropic magnetic flake of claim 10, wherein the indicium is symmetrical with respect to the direction of the in-plane magnetic anisotropy.

12. The anisotropic magnetic flake of claim 1, wherein a dielectric layer is disposed between the continuous magnetic layer and the first reflector layer.

13. The anisotropic magnetic flake of claim 1, wherein the magnetic material is a soft magnet.

14. The anisotropic magnetic flake of claim 1, wherein the anisotropic magnetic flake is manufactured by:
providing a substrate for supporting a releasable coating, which includes the continuous magnetic layer comprising the magnetic material;
embossing or etching the substrate with a plurality of frames having a shape corresponding to the two-dimensional layered structure with the two substantially parallel sides substantially orthogonal to a first direction before or after the releasable coating is applied to the substrate;
coating the substrate with the releasable coating so as to provide the continuous magnetic layer having a magnetic anisotropy in the first direction,
wherein the releasable coating, upon removal from the substrate, breaks apart into a plurality of anisotropic magnetic flakes; and
removing the releasable coating from the substrate and breaking the coating into the plurality of anisotropic magnetic flakes.

15. The anisotropic magnetic flake of claim 14, wherein the substrate is moving in the first direction during the coating.

16. The anisotropic magnetic flake of claim 14, wherein the substrate is curved.

17. The anisotropic magnetic flake of claim 14, wherein the substrate is coated by using at least two sources of the magnetic material that provide the magnetic material to a same portion of the substrate at different angles.

18. The anisotropic magnetic flake of claim 17, wherein the at least two sources of the magnetic material provide the magnetic material to the same portion of the substrate simultaneously.

19. The anisotropic magnetic flake of claim 17, wherein the at least two sources of the magnetic material provide the magnetic material to the same portion of the substrate at different times.

20. The anisotropic magnetic flake of claim 14, wherein the substrate is coated by moving the substrate in the first direction and using two sources of magnetic material disposed so that a line connecting the two sources is substantially orthogonal to the first direction.

21. The anisotropic magnetic flake of claim 14, wherein the substrate is coated by moving the substrate in the first direction and using two sources of magnetic material disposed so that a line connecting the two sources is substantially parallel to the first direction.

22. The anisotropic magnetic flake of claim 14, wherein the substrate is coated by annealing the magnetic material in a magnetic field.

23. The anisotropic magnetic flake of claim 14, wherein the substrate is coated by Xe-ion-irradiation of the magnetic material.

24. The anisotropic magnetic flake of claim 14, wherein the embossing or etching includes embossing or etching the substrate with an indicium.

* * * * *